US012342161B2

(12) United States Patent
Piri et al.

(10) Patent No.: US 12,342,161 B2
(45) Date of Patent: Jun. 24, 2025

(54) SYSTEM AND METHOD FOR FORWARDING AUTHENTICATION REQUESTS TO A NEARBY AUTHENTICATOR

(71) Applicant: IDMELON TECHNOLOGIES INC., Vancouver (CA)

(72) Inventors: Bahram Piri, Vancouver (CA); Hassan Seifi, Vancouver (CA)

(73) Assignee: IDMELON TECHNOLOGIES INC., Vancouver (CA)

( * ) Notice: Subject to any disclaimer, the term of this patent is extended or adjusted under 35 U.S.C. 154(b) by 472 days.

(21) Appl. No.: 17/894,784

(22) Filed: Aug. 24, 2022

(65) Prior Publication Data

US 2023/0063417 A1    Mar. 2, 2023

Related U.S. Application Data

(60) Provisional application No. 63/236,612, filed on Aug. 24, 2021.

(51) Int. Cl.
*H04M 1/66* (2006.01)
*H04L 67/133* (2022.01)
*H04W 4/80* (2018.01)
*H04W 12/04* (2021.01)
*H04W 12/06* (2021.01)

(52) U.S. Cl.
CPC .......... *H04W 12/06* (2013.01); *H04L 67/133* (2022.05); *H04W 4/80* (2018.02); *H04W 12/04* (2013.01)

(58) Field of Classification Search
CPC . H04W 12/06; H04W 12/062; H04W 12/065; H04W 12/069; H04W 12/04; H04W 4/80; H04L 63/08; H04L 9/30
See application file for complete search history.

(56) References Cited

U.S. PATENT DOCUMENTS

2015/0161587 A1\*  6/2015  Khan ................. G06Q 20/3223
                                                              705/44
2019/0207927 A1\*  7/2019  Lakhani ................. G06F 21/42
2019/0347649 A1\* 11/2019  Thompson .............. H04L 67/34

\* cited by examiner

*Primary Examiner* — Shantell L Heiber
(74) *Attorney, Agent, or Firm* — Norton Rose Fulbright Canada LLP

(57) ABSTRACT

Systems and methods that involve receiving an authentication request initiated by a relying party application on a computing device via Web Authentication (WebAuthn) interface; connecting to a nearby companion device; forwarding the authentication request to the authenticator on the companion device; receiving a response to that authentication request from the authenticator on the companion device; and transmitting the authentication response back to the sender application on the computing device for authentication purposes.

13 Claims, 6 Drawing Sheets

SYSTEM AND METHOD FOR FORWARDING AUTHENTICATION REQUESTS TO A NEARBY AUTHENTICATOR

CROSS REFERENCE TO RELATED APPLICATION

This application claims priority to and the benefit of U.S. Provisional Patent Application No. 63/236,612 the entire contents of which is hereby incorporated by reference.

FIELD

Embodiments described herein generally relate to authentication devices, and, in particular, to authentication data transfer between a computing device and a companion device.

BACKGROUND

Users of computing devices such as smartphones, tablets, wearable-computing devices, and personal computers can interact with web applications and other online resources that utilize the Web Authentication (WebAuthn) application program interface (API) to register and authenticate users using a cryptographic authenticator implemented in hardware and/or software. The authenticator can register a user with a given web application and later assert possession of the registered public key credential, and optionally verify the user, when requested by the web application.

Passwordless authentication systems allow users to log in to accessible servers by authenticating a user with a secure device instead of a password, and assert their identity to systems with a strong public key cryptographic credential rather than a shared secret (e.g., a password). The credentials belong to the user and are managed by the authenticator, with which the relying party application interacts through the client platform (e.g., a browser application). The relying party application can (with the user's consent) request the browser to create a new credential for future use by the relying party. The relying party application can also request the user's permission to perform authentication operations with an existing credential.

As an illustrative example, a passwordless authentication system allows a relying party application (e.g., a web server application) on a computing device to request a public key credential from a client (e.g., a web browser application). The credential request is passed to an authenticator (e.g., an application on a companion device held by the user), which prompts the user to accept or deny use or creation of a public key credential bound to the authenticator and the relying party.

SUMMARY

Embodiments described herein generally relate to authentication data transfer between a computing device and a companion device and, in particular, to systems and processes for capturing authentication requests, detecting a user's companion device, and forwarding the authentication requests to be processed on the companion device by an authenticator application for authentication purposes.

In an aspect, embodiments described herein provide a system for forwarding authentication requests to an authenticator. The system has a computing device with an operating system, a software protocol, and a web browser application that is configured with a WebAuthn Application Program Interface (API) to access a relying party application, the computing device having access to a network, the computing device using a standard transport for authentication. The system has an authenticator application on a companion device accessible through a personal network used as an entity that can be trusted for authentication purposes. The system has a physical device configured to receive authentication requests on the standard transport, to detect a communication tap of the companion device using signal monitoring, to initiate a connection with the companion device, to exchange authentication requests with the authenticator application on the companion device, and to write an appropriate authentication response on the same standard transport of the computing device that is used for authentication. The system has a simulated virtual assistant device containing a virtual driver and an assistant service installed on the computing device configured to receive authentication requests on the standard transport, to locate the companion device through the network, to initiate a connection with the companion device, to exchange authentication requests with the authenticator application on the companion device, and to write an appropriate authentication response on the same standard transport of the computing device that is used for authentication. The system has a messaging service application accessible to applications on the computing device and the companion device through the network configured to facilitate communication between the computing device and the authenticator application on the companion device.

In some embodiments, the simulated virtual assistant device communicates with the authenticator application on the companion device for authentication instead of the physical device communicating with the authenticator application on the companion device for authentication.

In some embodiments, the system communicates with the authenticator application on the companion device using the simulated virtual assistant device and not using the physical device.

In some embodiments, the simulated virtual assistant device simulates a standard compatible device for authentication using the standard transport.

In some embodiments, the standard transport comprises Human Computer Interface.

In some embodiments, the standard transport is selected from the group consisting of USB, NFC and Bluetooth.

In some embodiments, the personal network is a Bluetooth Low Energy network.

In some embodiments, the authentication requests are initiated at the relying party application or a website accessed by the web browser application using the WebAuthn API for authentication purposes.

In some embodiments, the authenticator application registers a user with a given relying party application using a registered public key credential, and asserts possession of the registered public key credential.

In some embodiments, the authenticator application verifies the user when requested by the relying party application.

In some embodiments, the authenticator application is implemented in hardware, software, or a combination hardware and software.

In some embodiments, the WebAuthn API defines a standard web interface enabling the creation and use of strong, attested, scoped, public key-based credentials by web applications to strongly authenticate users.

In some embodiments, an authentication request can start a registration process in which a public key credential is created on the authenticator application, and scoped to the relying party application with a user's account.

In some embodiments, an authentication request can start an authentication process in which the relying party application is presented with an authentication assertion proving the presence and consent of a user who registered a public key credential, or other authentication operation defined in WebAuthn standard interface used by the relying party application for authentication purposes.

In another aspect, there is provided a method for forwarding authentication requests to an authenticator application on a companion device. The method involves: accessing a relying party application using a computing device with an operating system, a software protocol, and a web browser application that is configured with a WebAuthn Application Program Interface (API); simulating, at the computing device, a virtual assistant device containing a virtual driver and an assistant service; receiving, at the virtual assistant device, authentication requests on the standard interface; transmitting, from the virtual assistant device, the authentication requests on the standard interface; providing a messaging service application accessible to applications on the computing device and the companion device through the network configured to facilitate communication between the computing device and an authenticator application on a companion device; locating the companion device through the network to initiate a connection with the companion device; and receiving an authentication response from the companion device and writing an appropriate authentication response on the standard interface In a further aspect, embodiments described herein provide a physical device accessible by an application through standard WebAuthn application program interface (API), comprising: one or more processors; a host controller and host interface like USB-HID configured to be accessible through WebAuthn API and/or a browser application; a network module configure to enable wireless communication to an authenticator on a companion device; memory storing computer-readable instructions which, when executed by the one or more processors, perform a method comprising the steps of: receive an authentication request; detect a communication tap via a method comprising the steps of: scan for the compatible companion devices nearby; receive signal strength indicator ("RSSI") value spikes based on the strength of a signal from the companion device, as observed by the physical device when user moves the companion device in the proximity of the companion device; monitor the received values for a predetermined along with implementing a filtering function to avoid noises; and detect a communication tap if the result of one RSSI value or multiple values during a short period of time reaches or exceeds a threshold configured for the contactless communication; initiate a connection with the detected companion device; send the authentication request to the authenticator on the detected companion device, and receive the response; and write the response on the host interface where the sender of the request can collect the data for relying party application for authentication purposes.

In some embodiments, the network module is a Bluetooth Low Energy module.

In some embodiments, the processor updates the structure of data for transmission through a personal wireless network.

In some embodiments, the processor manipulates the structure of the received response making it compatible to be transferred through the same interface the request enters the physical device.

In some embodiments, the processor configures a host controller comprising applications, device drivers, a bus driver (such as USB which provides a standard USB bus service abstraction to USB device drivers), a host controller driver, and a physical host controller, all of which provide access to standard ports for connecting to standard devices.

In some embodiments, the physical host controller is selected from the group consisting of physical USB host controller, NFC agent, and BLE agent.

In some embodiments, the bus driver comprises USB to provide a standard USB bus service abstraction to USB device drivers.

In some embodiments, the host controller is configured to provide a register and memory-based interface that the host controller driver utilizes to accomplish data transfers between the computing device (system) and the connected USB devices.

In another aspect, embodiments described herein provide a virtual assistant device comprising a virtual driver and an assistant service, installed on a computing device along with other applications, and accessible to a relying party application running inside a browser application through standard WebAuthn API (application program interface), the device comprising memory storing computer-readable instructions which, when executed by the one or more processors, configure the processor to: receive an authentication request through the interface presented by a virtual driver; communicate with the message service application available through the network to start a pairing process; wait for the user to take action with the companion device; pair the user's companion device with the computing device or the installed assistant service; initiate a connection with the paired companion device; send the authentication request to the authenticator on the paired companion device, and receive the response; and write the response on the interface where the sender of the request can collect the data for relying party application for authentication purposes.

In some embodiments, the processor is configured to extend the operating system in order to emulate a hardware device supporting authentication standard.

In some embodiments, the processor updates the structure of data for transmission through the network like the Internet.

In some embodiments, the processor manipulates the structure of the received response making it compatible to be transferred through the same interface virtual driver presents.

In some embodiments, the processor communicates with the assistant service to locate the target companion device through the network.

In some embodiments, the processor is configured to facilitate communication over the network as well as pairing the companion device with the computing device.

In some embodiments, the pairing process involves using a plain code or Quick Response (QR) manner.

In some embodiments, the processor is configured to be able to work as an application accessing user interface elements to display information on the computing device to the user.

In some embodiments, the processor is configured to be available for applications on both companion device and computing device through the network with a persistent storage in order to facilitate networking between the companion device and the computing device.

In some embodiments, the virtual assistant device further comprises a device driver to receive buffer input/output ("I/O") requests, configured to route the authentication requests an authenticator on a companion device.

An authenticator can be a cryptographic entity, existing in hardware and/or software, which can register a user and later assert possession of the registered public key credential, and optionally verify the user, when requested by an application. A WebAuthn Authenticator can be a roaming authenticator, a dedicated hardware subsystem integrated into the client device, or a software component of the client or client device. Authentication operations refer to both registration and assertion requests and any other related requests.

A computing device supports a Web Authentication (WebAuthn) application program interface (API) that is configured to access an authenticator over a standard transport such as Universal Serial Bus (USB), for example, using the HID (Human Interface Device) protocol. The HID can involve a Human Computer Interface (HCI), for example. USB is an example standard transport and other examples of standard transports include near-field communication (NFC) and Bluetooth. There can be hybrid methods that use both the Internet and Bluetooth to ensure proximity and for stability. The HID protocol is an example USB protocol built into peripheral computer hardware devices. WebAuthn API is compliant with portions of the Web Authentication protocol formerly referred to as FIDO 2.0 (Fast Identity Online) which describes an interoperable way of performing online authentication using physical devices across web browser applications.

When using WebAuthn API to access an authenticator from a browser application to perform authentication compliant with FIDO Alliances standards including FIDO 2.0, FIDO 2.1, and etc., it is possible for the computing device to be coupled to the authenticator through an interface, such as Universal Serial Bus (USB), using a Client-to-Authenticator Protocol (CTAP).

USB is a hardware protocol and a software protocol. USB Interfaces that reference HID do use the HID USB software protocol and use the HID (human interface device) drivers to communicate with hardware devices. A virtual device driver is a software device driver that emulates hardware and other devices so that multiple applications can access hardware interrupt channels, hardware resources, and memory without causing conflicts. A virtual HID driver, for example, can be installed on an operating system of a computing device to simulate a standard authenticator on a USB interface to receive the authentication request.

Either a physical device or a virtual device driver can be managed to forward the received request to a nearby authenticator on a companion device over the internet or Bluetooth Low Energy (BLE). The virtual device and physical device are implementing the same functionality; one through tap detection to initiate connection, and the other uses internet for communication.

In accordance with an aspect, embodiments described herein provide a system and method to direct the communication to a specified authenticator. A remote service may be implemented to ease the communication between an authenticator on a companion device and a virtual driver or an assistant service on a computing device.

In accordance with an aspect, embodiments described herein provide a system and method to help a user of a companion device to pair the authenticator with an assistant service or a virtual driver on a companion device by scanning a QR code or entering a code manually on the authenticator. The process will pair the companion device with the computing device too.

In accordance with an aspect, embodiments described herein provide a system and method to detect a nearby authenticator on a companion device via receive signal strength indicator (RSSI) monitoring. The physical device is equipped with a Bluetooth module and antenna that can be used to measure the RSSI values of a nearby BLE supported companion device to determine if the RSSI value reaches or exceeds a threshold configured for the companion device. The threshold can be configured using a software tool that interacts with the physical device, similarly to the way WebAuthn communicates. If the threshold is reached, the physical device and the companion device establish a secure communication connection. The devices communicate via the secure communication connection, and the connection is terminated when the communication interface stays idle for a time period (e.g. a few seconds).

DESCRIPTION OF THE FIGURES

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

DETAILED DESCRIPTION

Embodiments described herein provide systems and methods for authentication data transfer between a computing device and a companion device. Embodiments described herein provide systems and methods for capturing authentication requests, detecting a user's companion device, and forwarding the authentication requests to be processed on the companion device by an authenticator application for authentication purposes.

To use a passwordless authentication system, a relying party (e.g., web server) application running inside a web browser uses WebAuthn APIs to send authentication requests to a WebAuthn standard authenticator through an interface, such as USB as an example supported interface. Embodiments described herein are generally related to the process of forwarding authentication requests received on USB interface to an authenticator on a companion device across a network. The user of the companion device therefore can confirm and prove the identity to process the authentication request. The WebAuthn standard is used throughout the remainder of this application as one example of a passwordless authentication, but other authentication standards may also benefit from the techniques described herein. Other example authentication standards include U2F which is an older version of FIDO. There can also be a standard involving smart cards that communicates with the card through a pluggable NFC/RFID reader.

Figure 1:
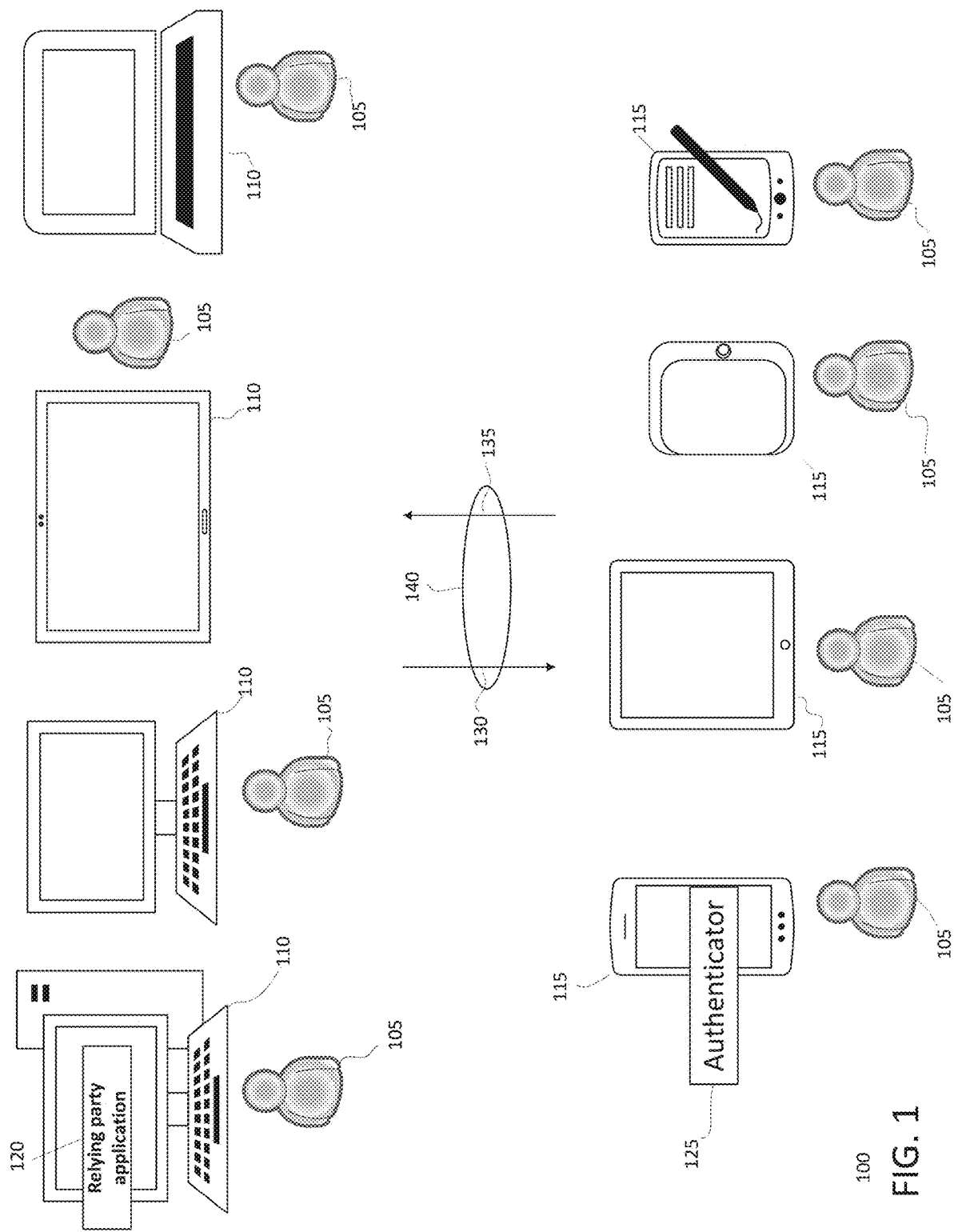
FIG. 1 shows an illustrative environment in which users' computing devices communicate with authenticators that are running on companion devices.

FIG. 1 shows an illustrative environment 100 of various computing devices 110 associated with respective users 105, configured to run a relying party application 120. The relying party application 120 can consist of both client-side script that invokes authentication requests in the client, and a server-side component that executes the relying party operations and other application logic, with network capabilities to communicate via network 140 with an authenticator 125 on a companion device 115. The relying party application 120 can be an entity whose web application utilizes the WebAuthn API to register and authenticate users. The network can include any type or collection of networks, such as a personal area network, local area network, wide area network, or the Internet. Thus, each of the devices 110 may be configured with Bluetooth, Wi-Fi, or hardwired (e.g., Ethernet cables) to transmit 130 and receive 135 signals, messages, etc. requests to the authenticator 125 on the user's companion device 115. The authenticator 125 can be a cryptographic entity, existing in hardware or software, that can register a user with a given relying party and later assert possession of the registered public key credential, and verify the user, when requested by the relying party.

The relying party application 120 implementation typically consists of client-side script that invokes the Web Authentication API in the client, and a server-side component that executes the relying party operations to register and authenticate a user, and other application logic. Example relying party operations include registering and authenticating users.

The computing devices 110 can include, for example tablets, PCs (personal computers), laptops, gaming consoles, or the like. The various devices in the environment can support different features, functionalities, and capabilities. For example, some devices 110 can support touch controls, gesture recognition, and voice commands, while others may enable a more limited user interface. Some devices may support video consumption and Internet browsing, while other devices may support more limited media handling and network interface features.

Furthermore, the companion devices 115 can include, for example smartphones, tablets, smartwatches, IoT devices, wristbands, gadgets or the like. While the companion devices 115 may provide different features, the companion devices 115 can be configured to run an authenticator application 125 that can register a user 105 with a given relying party application 120. The companion devices 115 can later assert possession of the registered public key credential, and optionally verify the user 105, when requested by the relying party application 120.

Figure 2:
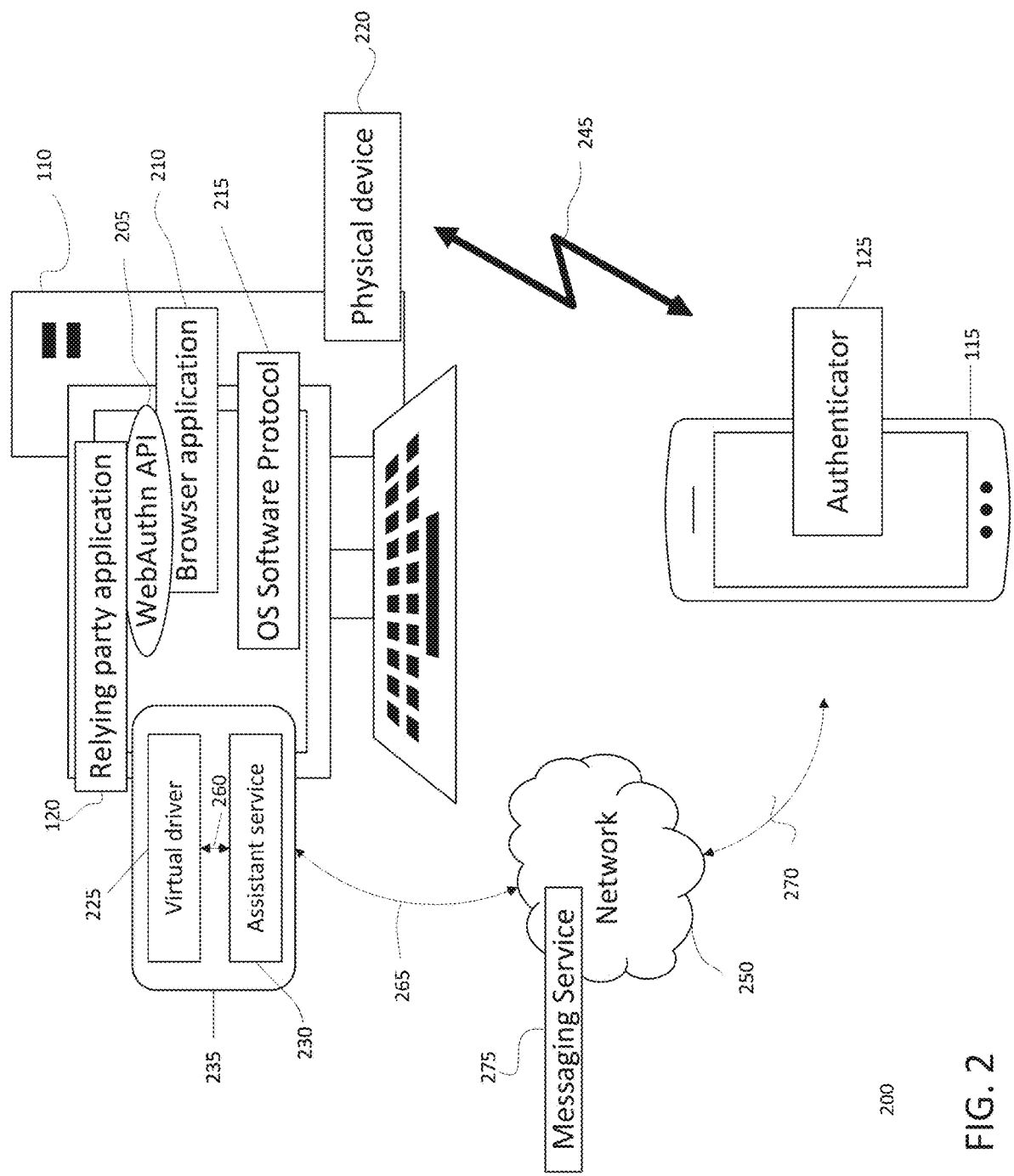
FIG. 2 illustrates a system-architecture diagram of an example environment in which a virtual driver or a physical device can be configured to route authentication requests.

Referring now to FIG. 2, there is shown an exemplary architecture of a system 200 having a computing device 110 configured to forward authentication requests to an authenticator 125 on a companion device 115 in different ways. For example, the computing device 110 can forward authentication requests to an authenticator 125 through the physical device 220 and over a wireless personal area network 245 (e.g., Bluetooth, Wi-Fi, and etc.). As another example, the computing device 110 can forward authentication requests to an authenticator 125 through a virtual assistant device 235 consisting of a virtual driver 225 and an assistant service 230 over a network 250. There can be a hardware path and/or software path for authentication requests. The virtual assistant device 235 and physical device 220 are implementing the same functionality; one through tap detection to initiate connection, and the other uses internet for communication.

The computing device 110 can have at least one hardware processor, memory, local storage device, network interface, and I/O interface. The processor may be, for example, a microprocessor or microcontroller, a digital signal processing (DSP) processor, an integrated circuit, a field programmable gate array (FPGA), a reconfigurable processor, or any combination thereof. Memory may include a suitable combination of any type of computer memory that is located either internally or externally. Each I/O interface enables computing device 110 to interconnect with one or more input devices, such as a keyboard, mouse, camera, touch screen and a microphone, or with one or more output devices such as a display screen and a speaker. Each network interface enables computing device 110 to communicate with other components, to exchange data with other components, to access and connect to network resources, to serve applications, and perform other computing applications by connecting to a network (or multiple networks) capable of carrying data, including a combination of different networks. The computing device 110 is operable to register and authenticate users (using a login, unique identifier, and password for example) prior to providing access to applications, a local network, network resources, other networks and network security devices. Computing devices 110 may serve one user or multiple users.

WebAuthn is a FIDO authentication standard used to access authenticator 125 on a companion device 115. Generally, there is a standard way to communication with standard devices used as part of the authentication process. For example, standard devices can use Bluetooth, USB, or NRF to communicate with the authenticator 125 on the companion device 115. However, this may not provide a stable communication channel or connection. For example, Bluetooth devices being handled or managed by an operation system on a computing device can become unstable when communicating with the authenticator 125 on the companion device 115. Accordingly, embodiments described herein enable communication with the authenticator 125 on the companion device 115 using the virtual assistant device 235 being introduced as an authentication standard compatible device. The virtual assistant device 235 can be installed on computing device 110, and, in some embodiments, the virtual assistant device 235 can be implemented at a physical device 220. The virtual assistant device 235 simulates a hardware key to communicate with the authenticator 125 on the companion device 115. The software for virtual assistant device 235 is stateless and does not store information, and instead provides a bridge to relay the communication to the authenticator 125 on the companion device 115.

The computing device 110 may include various applications, including a browser application 210 that allows the user to access websites on the Internet. The browser application can include WebAuthn capabilities, including a WebAuthn API 205 that specifies the API for creating and using public key credentials. The credentials belong to the user and are managed by an authenticator 125, with which the relying party application 120 interacts through the WebAuthn API 205. The relying party application (scripts) 120 can (with the user's consent) request the browser 210 to create a new credential for future use by the relying party application 120.

The physical device 220 and virtual device driver 225 provide an authenticator interface that can be recognized by the operating system (OS) software protocol 215 as a proper implementation (e.g. meet WebAuthn requirements) to serve the authentication requests.

The virtual assistant device 235 may additionally include other services running beside the virtual driver 225 and the assistant service 230 to facilitate the network communication. The communication between the components inside the virtual assistant device 235 may happen through some sort of operating system capabilities 260 (e.g., remote procedure call, inter-process communication, file, pipe and etc.) in which two independent programs or processes can communicate with each other to transmit the data between an authenticator and the user client application on the computing device. The user client application 230 may be configured to pair an authenticator 125 with a computing device 110. The virtual driver 225 simulates the standard authenticator that can be accessed by a standard transport like USB.

A physical device 220 or a virtual device driver 225 is implemented to be compatible with WebAuthn API 205 and can be accessed over a transport such as Universal Serial Bus (USB). For example, for USB, the physical device 220 or a virtual device driver 225 can be implemented to be compatible with WebAuthn API 205 using 16-bit numbers used to identify USB devices to a computer or other host. As part of the OS, the computing device 110 also runs an OS software protocol 215 that supports access to hardware or virtual devices. The OS software protocol 215 can support devices through software protocols and drivers. The OS software protocol 215 can operate and manage devices using driver. Requests can be routed to device 220 using built-in drivers.

The physical device 220 that receives the authentication requests through the OS software protocol 215 is configured to detect a nearby companion device 115 using RSSI signal monitoring to connect to the companion device 115, and exchange the authentication requests/responses over a wireless personal network 245 such as Bluetooth Low Energy protocol with the authenticator 125 on the companion device 115.

The virtual device driver 225 that is treated as a device, and an authenticator compatible with WebAuthn standard transport as far as user level software is concerned, but is generated by the kernel without reference to hardware, may be configured to work in conjunction with the assistant service 230 or another software service implemented as part of the virtual assistant device 235 to exchange the authentication requests/responses with the user's computing device 115 over a network 250. In some embodiments, there may be a messaging service 275 that can be configured to facilitate the communication 265 or 270, and to handle the process of paring the user's companion device 115 with the computing device 110 via the assistant service 230 installed as part of the virtual assistant device 235 on the user's computing device 110. For example, pairing can be implemented using machine readable codes.

The relying party application 120 which can consist of both client-side script that invokes the WebAuthn API in the client, and a server-side component that executes the Relying Party operations and other application logic can be accessed by a user 105 of computing device 110 through the web browser application 210 to reach an authenticator 125 on a companion device 115 for the authentication ceremony including registration and login. Generally, in the authentication ceremony, a user 105 and the user's authenticator work in concert to cryptographically prove to a relying party application 120 (and to the reply party web server) that the user controls the credential private key of a public key credential previously-registered as the result of the registration request. Note that this includes a test of user presence or user verification that is taking place or managing on the authenticator 125 itself.

The relying party application 120 registers a user the first time by sending a registration request to the authenticator, and receiving a response that is signed by the authenticator 125. Subsequently, when the relying party application 120 logs into the registered user, the relying party sends a login request and receives a login response that is signed by the same authenticator 125.

Figure 3A:
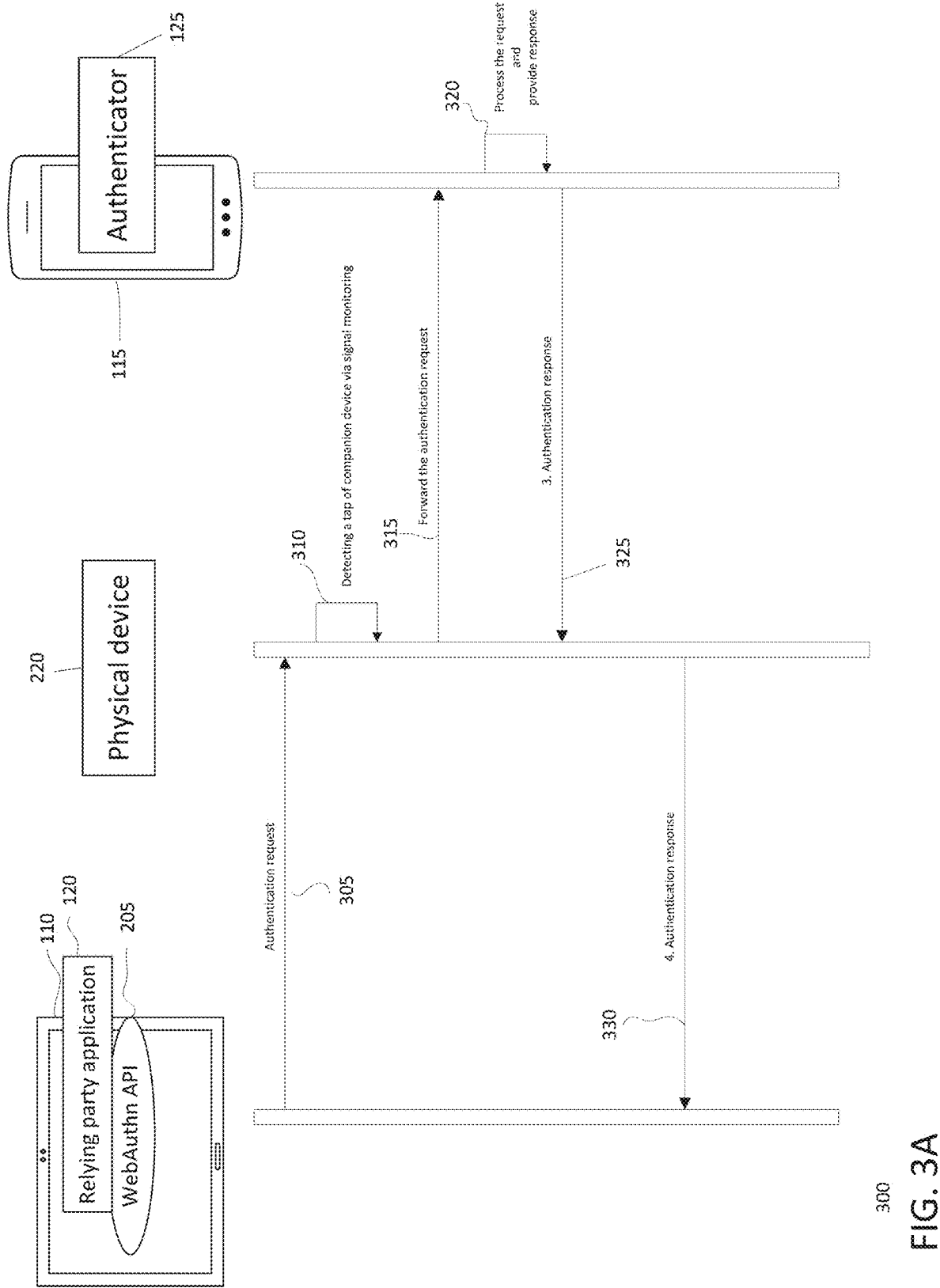
FIG. 3A-B show illustrative actions performed among the computing device, physical device or virtual driver/assistant service, and the authenticator on the companion device during forwarding an authentication request.
Figure 3B:
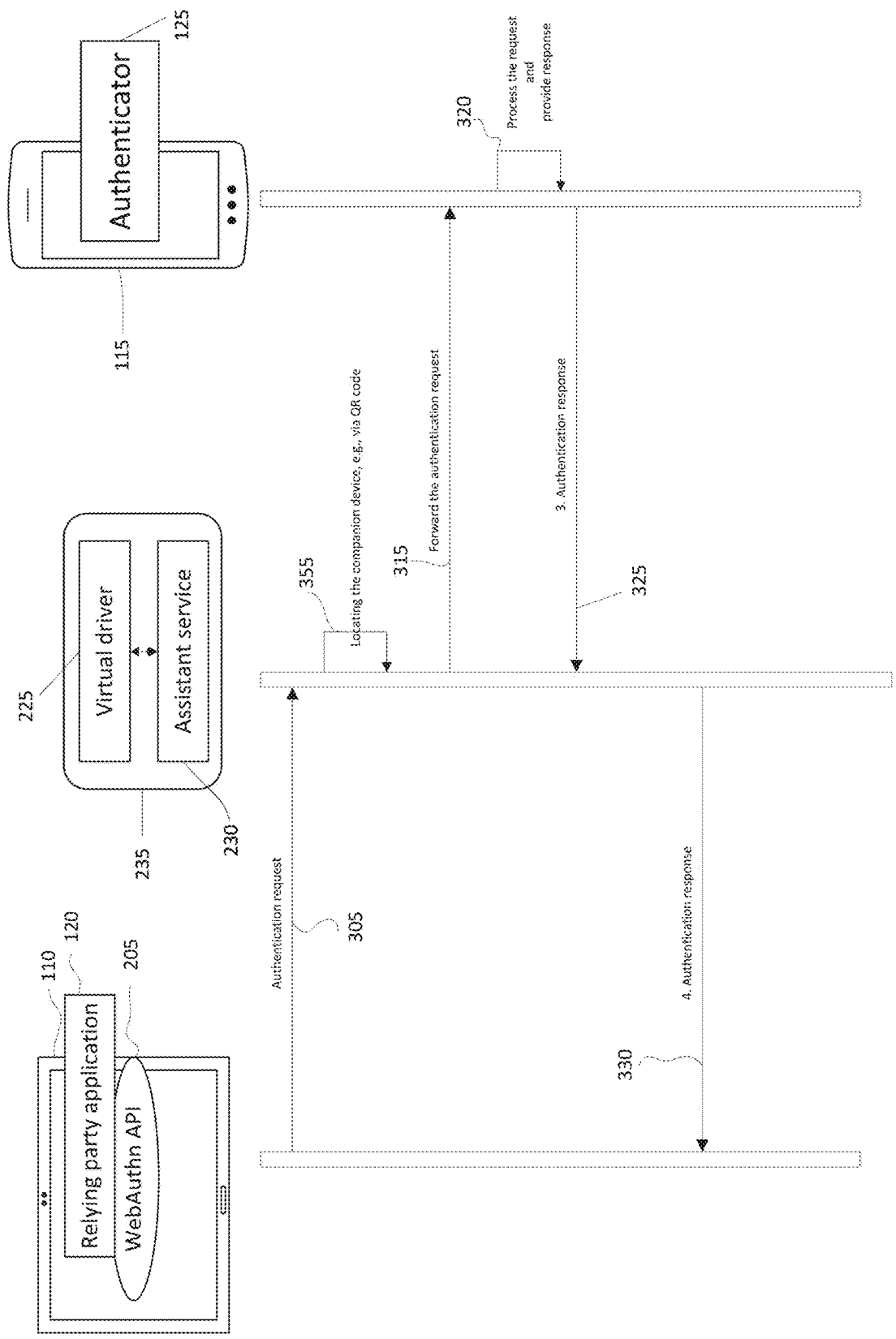

Referring now to FIG. 3A-B, a message flow diagram illustrates how a physical device 220 or a virtual assistant device 235 can forward the authentication requests initiated by the relying party application 120 using the WebAuthn API 205 on the computing device 110 for authentication purposes. The message flow can be between WebAuthn API or client applications on computing device and authenticator. Generally, in the authentication ceremony, a user 105 and the user's authenticator work in concert to cryptographically prove to a relying party application 120 (and to the reply party web server) that the user controls the credential private key of a public key credential previously-registered as the result of the registration request. Note that this can include a test of user presence or user verification that is taking place or managing on the authenticator 125 itself.

As shown in FIG. 3A, initially, the WebAuthn API 205 is used to send an authentication request 305 initiated by the relying party application 120 to the physical device 220 through a standard transport such as USB. The physical device 220 can be configured to detect a communication tap using signal monitoring 310 of a companion device 115 that defines an authenticator 125 on BLE interface. The companion device 115 creates receive signal strength indicator ("RSSI") value spikes. The physical device 220 measures the RSSI values and determines if the RSSI value reaches or exceeds a threshold configured to detect a communication tap 310. The threshold can be configured at the time of programing the device, and can be changed for better detection or accuracy through a software tool. When a tap is detected, a Bluetooth connection request can be sent to the broadcasting authenticator. When accepted the request will be sent and the response will be received. The tap detection process can avoid errors. If the threshold is reached, it means that the companion device 115 is close enough and can be recognized as a device 115 supporting an authenticator 125 with which a user is willing to authenticate into the relying party application 120. The physical device 220 then establishes a wireless secure communication connection with the companion device 115 and forwards the authentication request 315 to be processed on the authenticator 125. Alternatively, the physical device 220 can be also configured to forward the authentication request 315 to a previously paired companion device 115 holding an authenticator 125.

The authentication request can be a login, a registration request, or any other operations supported by the standard authentication protocol. The authenticator 125 processes the request, provides a response 320 and replies it back to the physical device 220 as the authentication response 325. The authenticator 125 can implement different operations such as authentication, registration, and other authenticator operations such as setting passwords, and so on. The physical device 220 will do the same job and write the authentication response 330 on the previously defined interface where the WebAuthn API 205 can collect the response for relying party application 120.

As shown in FIG. 3B, the virtual driver 225 as part of virtual assistant device 235 receives the authentication request 305, sent by a relying party application 120 on a computing device 110 using WebAuthn API 205. The virtual driver 225 then can work in conjunction with the assistant service 230 to locate the user's companion device 115 over the network 355. The assistant service 230 can help to ease the internet communication with outside which can be a hard job for driver which lives in kernel with limited resources. It can detect companion device 115 through a pairing process that can be implemented by scanning a machine readable code such as a QR code.

The process of locating the user's companion device 355 can be interpreted as linking/pairing the user's companion device 115 or authenticator 125 to/with the computing device 110 or the virtual assistant device 235 over the underlying network such as the Internet. As noted, a linking/pairing process can be implemented by scanning a machine readable code such as a QR code. In an example embodiment, the assistant service 230 may be configured to allow a user to use an authenticator 125 on a companion device 115 such as a smartphone to scan a QR (Quick Response) code displayed on the computing device 110. Alternatively, the user may need to enter a plain code displayed on the computing device 110 inside the authenticator 125 on the companion device 115. The assistant service 230 or the virtual driver 225 inside the virtual assistant device 235 then establishes a secure connection with the companion device 115, and forwards the authentication request 315 to be processed on the authenticator 125.

The authentication request 305 can be a login carrying relying party application information, randomly generated data, and optionally public credential information expecting to receive a response that is cryptographically signed by previously generated private key pair on the authenticator a registration request carrying relying party application information, user information, and randomly generated data expecting to receive a response from a verified authenticator that includes public key cryptography information about the registered credential that can later be used to verify the login request, or any other operations supported by the standard authentication protocol. The authenticator 125 processes the request, provides a response 320 and replies it back to the virtual assistant device 235 as the authentication response 325. The virtual driver 225 inside the virtual assistant device 235 writes the authentication response 330 in proper format on the previously defined interface where the WebAuthn API 205 can collect the response for relying party application 120.

Figure 4:
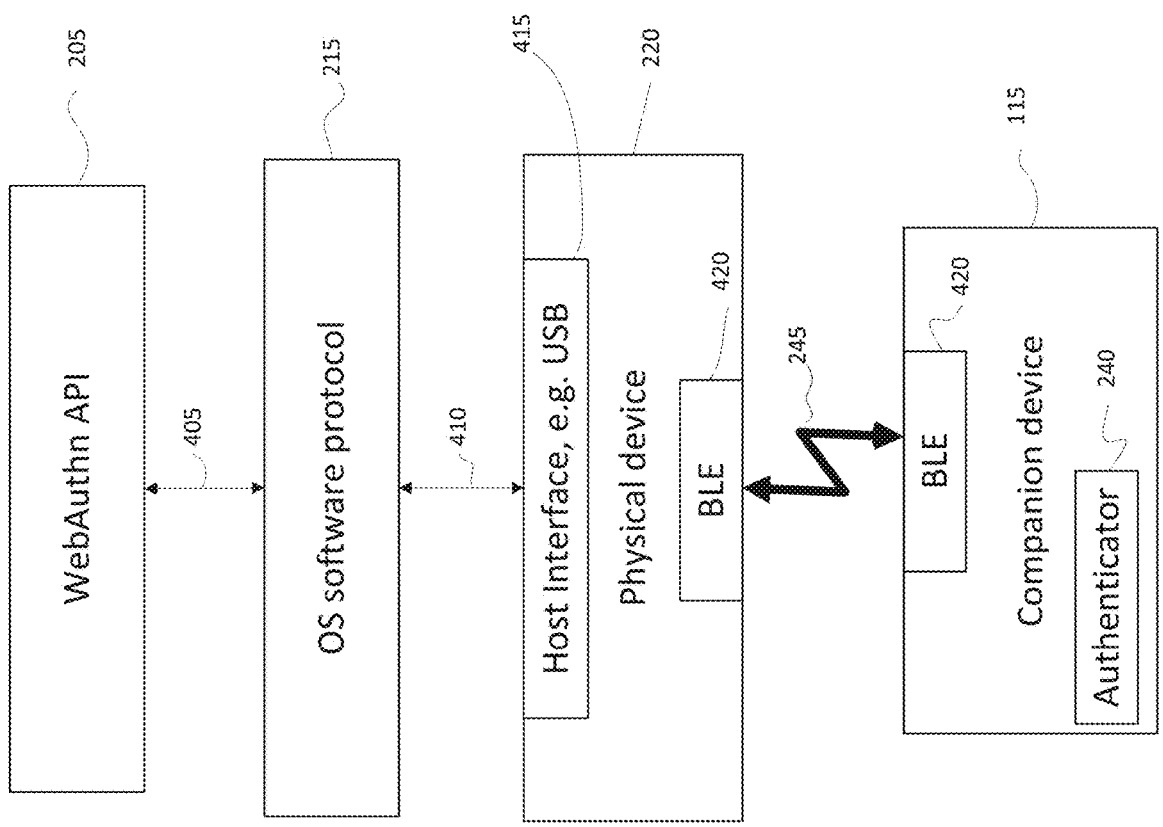
FIG. 4 shows illustrative methods performed by the physical device to detect the nearby companion device using signal monitoring.

FIG. 4 is a flowchart of an illustrative system 400 to configure physical device 220 to detect the communication tap of a companion device 115 using BLE module 420 in order to forward the authentication requests to the user's companion device 115 through a personal local network such as BLE protocol 245. In an example embodiment, the physical device 220 is configured to present a host interface like USB 415 that can be accessed by OS software protocol 215 to communicate 410 over USB transport that is supported by WebAuthn API 205 and is used to exchange authentication messages 405. The authenticator 240 being implemented on a companion device 115 can be accessed over Bluetooth Low Energy interface.

Figure 5:
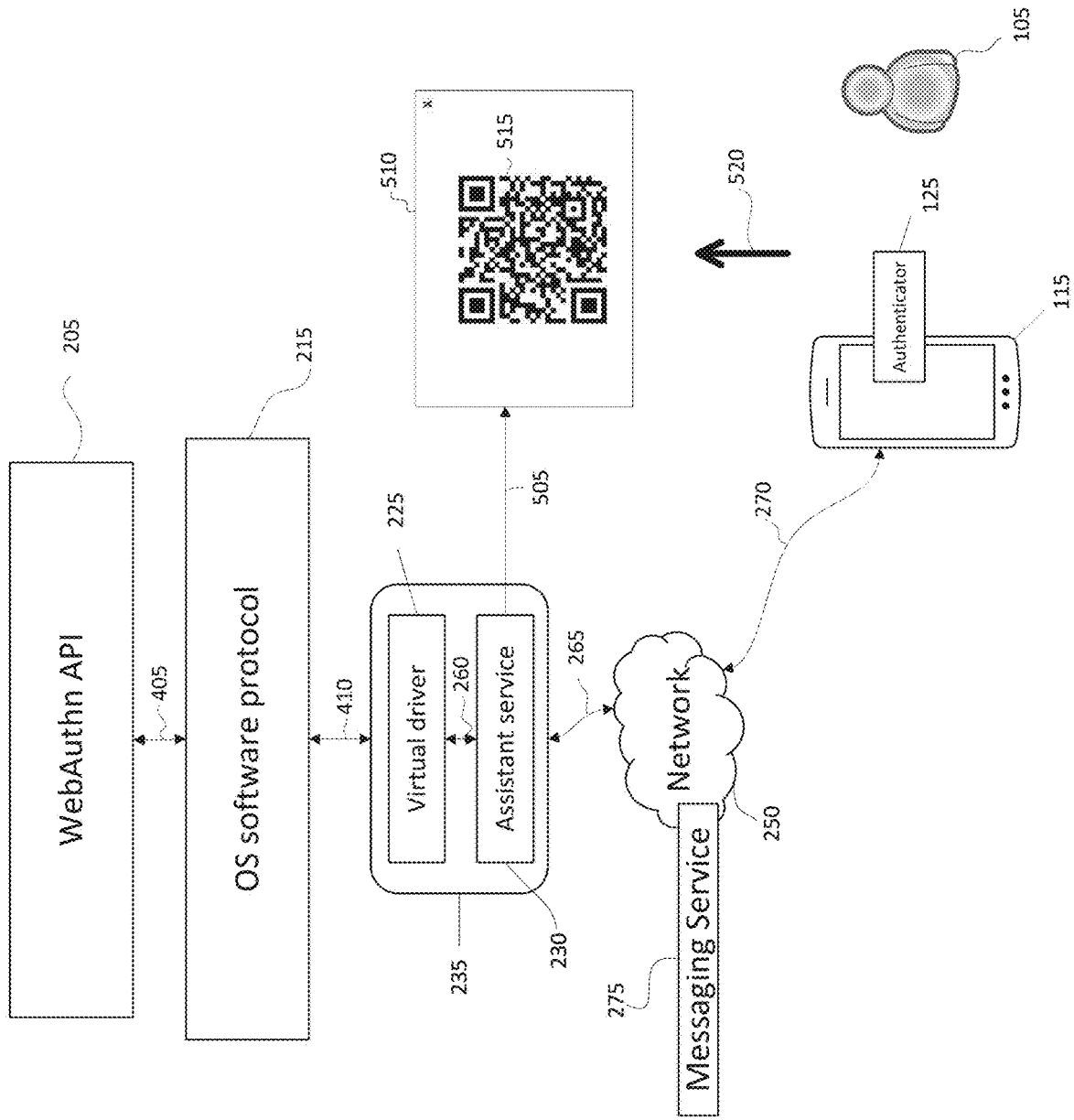
FIG. 5 shows illustrative methods performed by the virtual driver or the assistant service to manage pairing of the companion device with the computing device.

Referring now to FIG. 5, a flowchart of an illustrative system 500 to configure virtual assistant device 235 to forward authentication requests to the user's companion device 115. Initially, WebAuthn API 205 is used to initiate an authentication request over a standard transport. The OS software protocol receives the request, searches for the appropriate device driver that can be accessed to hand the received authentication requests. The virtual driver 225 can be hardware to support the appropriate authentication interface supported by WebAuthn API 205. The OS software protocol 215 routes the authentication requests into the virtual driver 225. The virtual driver 225 then communicates 260 with the assistant service 230 over an operating system communication mechanism such as Inter-Process Communication, Pipe, Message Queue, Socket, Shared-Memory, and so on to forward the authentication request to the authenticator 125 on the companion device 115. The virtual assistant device 235 and more specifically the assistant service 505 may work in conjunction with a messaging service application 275 that is available through the network to generate and show a QR (Quick Response) 515 code or a plain code to be displayed 510 on the computing device. The user 105 of the companion device may use the authenticator 125 or any other installed application to scan the QR code or enter the plain code to pair this companion device to the associated assistant service 230 or the virtual device assistant 235 on the computing device. The assistant service 230 then locates the linked authenticator 125 and communicates with the authenticator 125 to exchange the authentication operations.

The authenticator on the companion device 110 responds with an authentication response 275, which authenticates the user identity of the user device 110 to the identity server 120. Once the identity server 120 determines that the authenticated user identity of the user device 110 is authorized to authenticate the credential request 265 from the relying party 130, the identity server 120 sends a credential request 280 to the user device 110. The user device 110 generates a credential response 285 and sends the credential response 285 to the identity server 120. The identity server 120 processes the credential response 285 from the user device 110 and responds to the credential request 265 by sending a credential response 290 to the relying party 130, authenticating the user device 110 to the relying party 130.

The system 100 also includes an identity server 120 with authentication code 122 and user identity code 124. A relying party application 130, such as a web server or a server providing a remote application, is also coupled to the identity server 120, which participates in the authentication exchange of the user device 110 to the relying party application 130. The identity server 120 is coupled to a hardware storage module 140, which stores user identity credentials 145.

What is claimed is:

1. A system for forwarding authentication requests to an authenticator, the system comprising:
    a computing device with an operating system, a software protocol, and a web browser application that is configured with a WebAuthn Application Program Interface (API) to access a relying party application, the computing device having access to a network, the computing device using a standard transport for authentication;
    an authenticator application on a companion device accessible through a personal network used as an entity that can be trusted for authentication purposes;
    a physical device configured to receive authentication requests on the standard transport, to detect a communication tap of the companion device using signal monitoring, to initiate a connection with the companion device, to exchange authentication requests with the authenticator application on the companion device, and to write an appropriate authentication response on the same standard transport of the computing device that is used for authentication;

a simulated virtual assistant device containing a virtual driver and an assistant service installed on the computing device configured to receive authentication requests on the standard transport, to locate the companion device through the network, to initiate a connection with the companion device, to exchange authentication requests with the authenticator application on the companion device, and to write an appropriate authentication response on the same standard transport of the computing device that is used for authentication;

a messaging service application accessible to applications on the computing device and the companion device through the network configured to facilitate communication between the computing device and the authenticator application on the companion device.

2. The system of claim 1, wherein the simulated virtual assistant device communicates with the authenticator application on the companion device for authentication instead of the physical device communicating with the authenticator application on the companion device for authentication.

3. The system of claim 1, wherein the system communicates with the authenticator application on the companion device using the simulated virtual assistant device and not using the physical device.

4. The system of claim 1 wherein the simulated virtual assistant device simulates a standard compatible device for authentication using the standard transport.

5. The system of claim 1, wherein the computing device uses Human Interface Device protocol for authentication using the standard transport.

6. The system of claim 1, wherein the standard transport is selected from the group consisting of USB, NFC and Bluetooth.

7. The system of claim 1, wherein the personal network is a Bluetooth Low Energy network.

8. The system of claim 1, wherein the authentication requests are initiated at the relying party application or a website accessed by the web browser application using the WebAuthn API for authentication purposes.

9. The system of claim 1, wherein the authenticator application registers a user with a given relying party application using a registered public key credential, and asserts possession of the registered public key credential.

10. The system of claim 9 wherein the authenticator application verifies the user when requested by the relying party application.

11. The system of claim 1, wherein the WebAuthn API defines a standard web interface enabling the creation and use of strong, attested, scoped, public key-based credentials by web applications to strongly authenticate users.

12. The system of claim 1, wherein an authentication request can start a registration process in which a public key credential is created on the authenticator application, and scoped to the relying party application with a user's account.

13. The system of claim 1, wherein an authentication request can start an authentication process in which the relying party application is presented with an authentication assertion proving the presence and consent of a user who registered a public key credential, or other authentication operation defined in WebAuthn standard interface used by the relying party application for authentication purposes.

* * * * *